(12) United States Patent
Yoshida et al.

(10) Patent No.: US 12,504,387 B2
(45) Date of Patent: Dec. 23, 2025

(54) X-RAY INSPECTION APPARATUS AND SENSITIVITY CORRECTION METHOD FOR X-RAY INSPECTION APPARATUS

(71) Applicant: ISHIDA CO., LTD., Kyoto (JP)

(72) Inventors: Keisuke Yoshida, Ritto (JP); Futoshi Yurugi, Ritto (JP); Osamu Hirose, Ritto (JP); Kazuyuki Sugimoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 151 days.

(21) Appl. No.: 18/595,482

(22) Filed: Mar. 5, 2024

(65) Prior Publication Data

US 2024/0310301 A1    Sep. 19, 2024

(30) Foreign Application Priority Data

Mar. 17, 2023 (JP) .................. 2023-043379

(51) Int. Cl.
*G01N 23/04* (2018.01)
*G01N 23/083* (2018.01)

(52) U.S. Cl.
CPC ........... *G01N 23/04* (2013.01); *G01N 23/083* (2013.01); *G01N 2223/643* (2013.01)

(58) Field of Classification Search
CPC ................. G01N 23/04; G01N 23/083; G01N 2223/643; G01N 23/18; G01N 23/087;
(Continued)

(56) References Cited

U.S. PATENT DOCUMENTS

2014/0294151 A1* 10/2014 Suyama ................ G01V 5/224
378/62
2019/0212464 A1* 7/2019 Ikeda ..................... G01N 23/18
(Continued)

FOREIGN PATENT DOCUMENTS

JP    2001004560 A  *  1/2001
JP    2014-134457 A    7/2014
(Continued)

OTHER PUBLICATIONS

International Search Report dated Aug. 26, 2024.

*Primary Examiner* — Courtney D Thomas
(74) *Attorney, Agent, or Firm* — Global IP Counselors, LLP (57) ABSTRACT

An X-ray inspection apparatus includes a conveying unit configured to convey an article, an X-ray source configured to irradiate the article with X-rays, a detection unit configured to detect the X-rays by photon counting, a threshold value setting unit configured to set a threshold value for discriminating the X-rays, an inspection unit configured to inspect the article on the basis of the X-rays transmitted through the article, the X-rays being detected by the detection unit, and a sensitivity correction unit configured to perform sensitivity correction of the detection unit on the basis of the X-rays not transmitted through the article, the detection unit is configured to discriminate and detect the X-rays into the two or more energy regions by using the threshold value, and the sensitivity correction unit is configured to perform the sensitivity correction when the threshold value setting unit changes the threshold value.

6 Claims, 9 Drawing Sheets

(58) Field of Classification Search
CPC ....... G01N 2223/401; G01N 2223/423; G01N 2223/424; G01V 5/00; G01V 13/00
See application file for complete search history.

(56) References Cited

U.S. PATENT DOCUMENTS

2023/0175984 A1  6/2023  Yoshida et al.
2023/0284991 A1  9/2023  Iwakawa et al.

FOREIGN PATENT DOCUMENTS

| JP | 6569070 B | 9/2019 |
| JP | 2023-082280 A | 6/2023 |
| JP | 2023-132587 A | 9/2023 |
| WO | 2018/066364 A1 | 4/2018 |

* cited by examiner

X-RAY INSPECTION APPARATUS AND SENSITIVITY CORRECTION METHOD FOR X-RAY INSPECTION APPARATUS

CROSS REFERENCE TO RELATED APPLICATIONS

This application claims the benefit of priority to Japanese Patent Application Number 2023-043379 filed on Mar. 17, 2023. The entire contents of the above-identified application are hereby incorporated by reference.

TECHNICAL FIELD

An aspect of the disclosure relates to an X-ray inspection apparatus and a sensitivity correction method for the X-ray inspection apparatus.

BACKGROUND

As an X-ray inspection apparatus in the related art, for example, the device described in JP 6569070 B is known. The X-ray inspection apparatus described in JP 6569070 B includes an X-ray detection means configured to identify and detect individual photons of X-rays transmitted through an object to be measured into two or more energy regions by comparing the energy of each photon with a predetermined number of energy threshold values, a storage means configured to store, for each of a plurality of types of objects to be measured, the object to be measured and the energy threshold value directly or indirectly associated with each other, a threshold value setting means configured to refer to the storage means and hold a threshold value corresponding to the object to be measured whose type is specified by input information such that the X-ray detection means can refer to the threshold value as a predetermined threshold value, and an inspection means configured to inspect the object to be measured on the basis of the number of photons detected by the X-ray detection means for each of one or more predetermined energy regions or an amount corresponding to the number of photons.

SUMMARY

In the X-ray inspection apparatus described above, energy threshold values that are stored in advance in the storage means and that correspond to physical properties of articles as objects to be measured can be used. However, for example, when an article to be inspected by the X-ray inspection apparatus is changed, inspection performance of the X-ray inspection apparatus is not fully achieved in some cases.

An object of an aspect of the disclosure is to provide an X-ray inspection apparatus capable of achieving satisfactory inspection performance and a sensitivity correction method for the X-ray inspection apparatus.

(1) An X-ray inspection apparatus according to an aspect of the disclosure includes a conveying unit configured to convey an article, an X-ray source configured to irradiate the article being conveyed by the conveying unit with X-rays, a detection unit configured to detect the X-rays by photon counting, a threshold value setting unit configured to set a threshold value for discriminating the X-rays detected by the detection unit into two or more energy regions, an inspection unit configured to inspect the article on the basis of the X-rays transmitted through the article, the X-rays being detected by the detection unit, and a sensitivity correction unit configured to perform sensitivity correction of the detection unit on the basis of the X-rays not transmitted through the article, the X-rays being detected by the detection unit, the detection unit discriminates and detects the X-rays into the two or more energy regions by using the threshold value, and the sensitivity correction unit performs the sensitivity correction when the threshold value setting unit changes the threshold value.

To achieve satisfactory inspection performance of the X-ray inspection apparatus including the detection unit configured to detect by photon counting, it is important not only to set the threshold value depending on the article that is an inspection target but also to perform sensitivity correction (calibration) of the detection unit depending on the threshold value. In the X-ray inspection apparatus, the sensitivity correction unit performs the sensitivity correction when the threshold value setting unit changes the threshold value. Thus, the sensitivity correction can be performed depending on the set threshold value. As a result, satisfactory inspection performance of the X-ray inspection apparatus can be achieved.

(2) The X-ray inspection apparatus according to (1) described above may further include an image generation unit configured to generate two or more X-ray transmission images corresponding to the two or more energy regions on the basis of an output result of the detection unit, and the threshold value setting unit may set the threshold value on the basis of gray levels of the two or more X-ray transmission images generated by the image generation unit. In this case, for example, when the article to be inspected by the X-ray inspection apparatus is changed, the threshold value setting unit can set an appropriate threshold value depending on the change by using the two or more X-ray transmission images. In addition, the sensitivity correction is performed corresponding to the set threshold value. As a result, even when the article is changed, satisfactory inspection performance can be achieved.

(3) The X-ray inspection apparatus according to (1) or (2) described above may further include a storage unit configured to store the threshold value, the storage unit may store the threshold value corresponding to a type of the article, and the sensitivity correction unit may perform the sensitivity correction when the type of the article is switched. In this case, since the sensitivity correction can be performed by using the threshold value corresponding to the type of the article, satisfactory inspection performance of the X-ray inspection apparatus can be achieved.

(4) The X-ray inspection apparatus according to any one of (1) to (3) described above may further include a storage unit configured to store the threshold value, the storage unit may store the threshold value corresponding to a type of the article, and the sensitivity correction unit may perform the sensitivity correction when the type of the article is switched and the threshold value is changed. In this case, since the sensitivity correction is not performed unless the threshold value is changed, preparation of the X-ray inspection apparatus can be made efficient.

(5) A sensitivity correction method for an X-ray inspection apparatus according to another aspect of the disclosure includes detecting X-rays not transmitted through an article by a detection unit configured to detect electromagnetic waves by photon counting, the detection unit discriminating the electromagnetic waves into two or more energy regions by using an arbitrary threshold value, and performing sensitivity correction of the detection unit on the basis of the X-rays detected by the detection unit, in which the sensitivity correction is performed when the arbitrary threshold value is changed. In the sensitivity correction method, the sensitivity correction is performed when the arbitrary threshold value is changed. Thus, the sensitivity correction can be performed corresponding to the arbitrary threshold value that has been set. As a result, satisfactory inspection performance of the X-ray inspection apparatus can be achieved.

(6) The sensitivity correction method according to (5) described above may further include generating two or more X-ray transmission images corresponding to the two or more energy regions on the basis of an output result of the detection unit, and setting the arbitrary threshold value on the basis of gray levels of the two or more X-ray transmission images. In this case, for example, when the article to be inspected by the X-ray inspection apparatus is changed, an appropriate threshold value corresponding to the change can be set by using the two or more X-ray transmission images. In addition, the sensitivity correction can be performed corresponding to the set threshold value. As a result, even when the article is changed, satisfactory inspection performance can be achieved.

According to an aspect of the disclosure, an X-ray inspection apparatus capable of achieving satisfactory inspection performance and a sensitivity correction method for the X-ray inspection apparatus can be provided.

DESCRIPTION OF EMBODIMENTS

A preferred embodiment of the disclosure will be described below in detail with reference to the attached drawings. Note that, in the description of the drawings, like or equivalent elements are denoted by the same reference signs and redundant descriptions thereof will be omitted. In the claims and the specification, the phrase "A or B" means that either A or B is included, and it is also acceptable to include both A and B.

Figure 1:
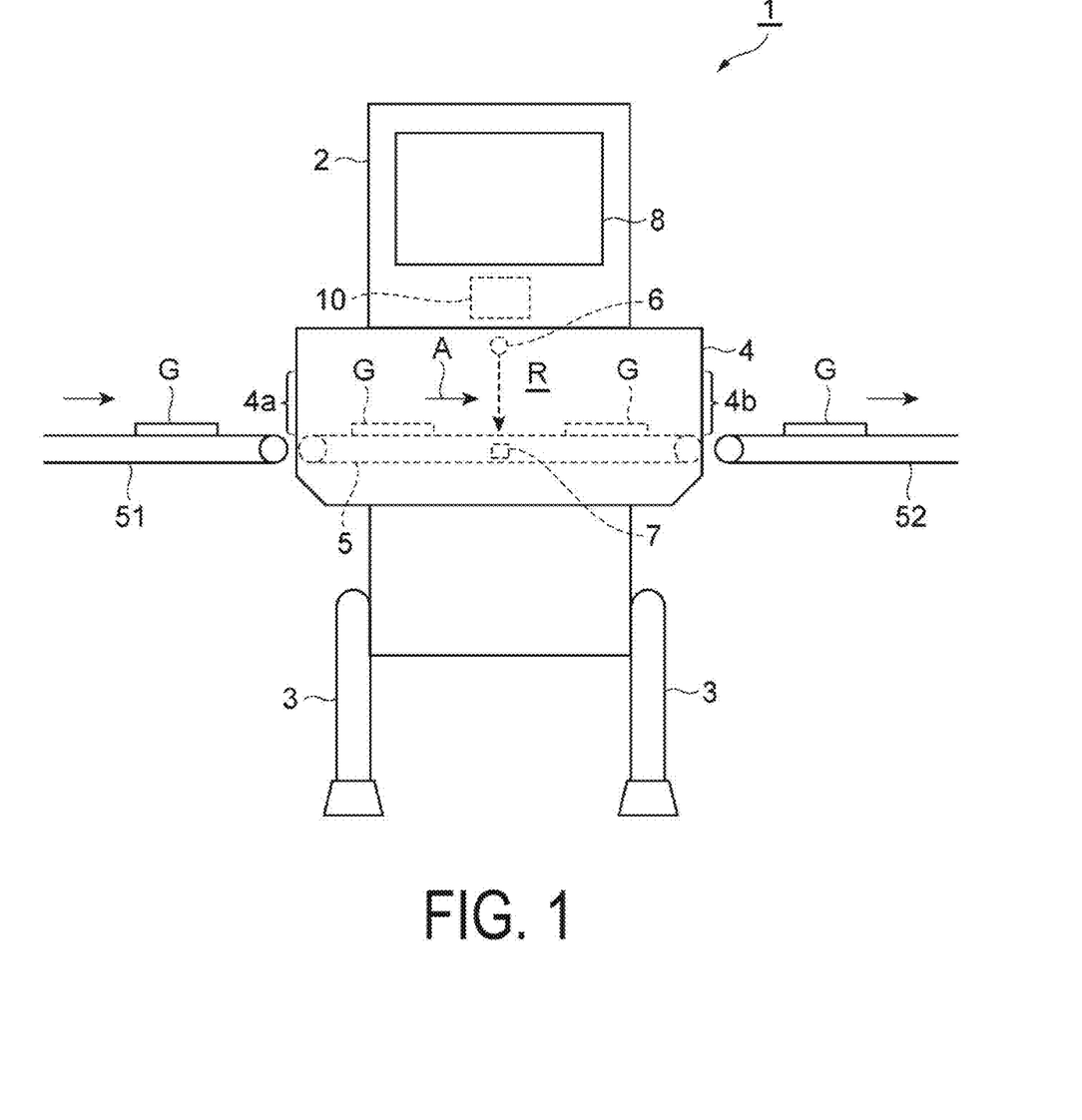
FIG. 1 is a configuration diagram illustrating an X-ray inspection apparatus according to an embodiment.

As illustrated in FIG. 1, an X-ray inspection apparatus 1 includes a device main body 2, support legs 3, a shield box 4, a conveying unit 5, an X-ray irradiation unit 6, an X-ray detection unit (detection unit) 7, a display operation unit 8, and a control unit 10. The X-ray inspection apparatus 1 generates an X-ray transmission image of an article G while conveying the article G, and conducts an inspection (e.g., an accommodated quantity inspection, a foreign matter inspection, a missing part inspection, or a chip/crack inspection) of the article G on the basis of the X-ray transmission image. The article G before the inspection is carried into the X-ray inspection apparatus 1 by a carry-in conveyor 51. The article G after the inspection is carried out from the X-ray inspection apparatus 1 by a carry-out conveyor 52.

The device main body 2 accommodates the control unit 10 and other constituent elements. The support legs 3 support the device main body 2. The shield box 4 is provided at the device main body 2. The shield box 4 is a housing that prevents leakage of X-rays (electromagnetic waves) to the outside. An inspection chamber R is provided in an interior of the shield box 4. In the inspection chamber R, the article G is inspected by the X-rays. A carry-in port 4a and a carry-out port 4b are formed in the shield box 4. The article G before the inspection is carried into the inspection chamber R from the carry-in conveyor 51 via the carry-in port 4a. The article G after the inspection is carried out from the inspection chamber R to the carry-out conveyor 52 via the carry-out port 4b.

The conveying unit 5 is an unit that conveys the article G and is disposed passing through the center of the shield box 4. The conveying unit 5 conveys the article G from the carry-in port 4a to the carry-out port 4b through the inspection chamber R along a conveyance direction A. The conveying unit 5 is, for example, a belt conveyor that extends between the carry-in port 4a and the carry-out port 4b. Note that the conveying unit 5 may protrude further outward than the carry-in port 4a and the carry-out port 4b.

Figure 2:
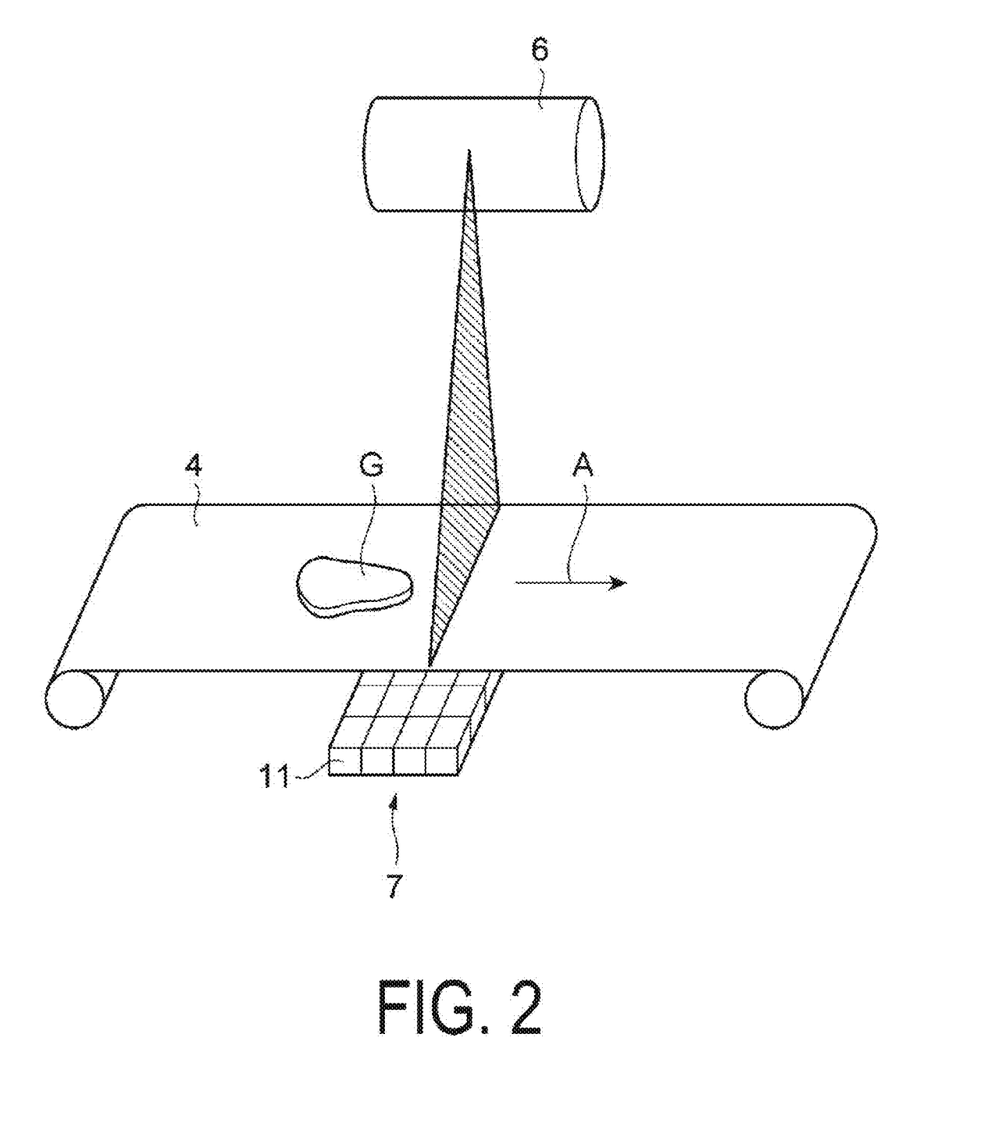
FIG. 2 is a configuration diagram illustrating an interior of a shield box illustrated in FIG. 1.

As illustrated in FIG. 1 and FIG. 2, the X-ray irradiation unit 6 is an electromagnetic wave irradiation unit (X-ray source) disposed in the shield box 4. The X-rays, which are electromagnetic waves to be irradiated from the X-ray irradiation unit 6, may include X-rays of various energy regions from low energy (at long wavelengths) to high energy (at short wavelengths). The X-ray irradiation unit 6 irradiates the article G being conveyed by the conveying unit 5 with X-rays of a plurality of energy regions. Immediately after the X-ray irradiation unit 6 is activated, output of the X-rays may be unstable. For this reason, after activation of the X-ray inspection apparatus 1 and before inspection of the article G, X-ray irradiation by the X-ray irradiation unit 6 (that is, idling of the X-ray irradiation unit 6) may be performed. Note that the words "low" and "high" related to the above-described low energy and high energy respectively mean relatively "low" and relatively "high" in a plurality of energy regions to be irradiated from the X-ray irradiation unit 6, and do not mean specific ranges.

The X-ray detection unit 7 is a sensor unit that detects electromagnetic waves. The X-ray detection unit 7 is disposed in the shield box 4 at a position facing the X-ray irradiation unit 6 in an up-down direction. In the present embodiment, the X-ray detection unit 7 is a direct conversion type detection unit that can detect X-rays by photon counting, and, for example, includes sensors 11 (multi-energy sensors) that detect X-rays in a plurality of energy regions and that are transmitted through the article G. The sensors 11 are aligned at least in a direction (width direction) orthogonal to the conveyance direction of the conveying unit 5 and the up-down direction, for example. The sensors 11 may be aligned not only in the width direction described above but also in the conveyance direction described above. In the present embodiment, the X-ray detection unit 7 includes a group of sensors 11 that are two-dimensionally arranged. An example of the sensor 11 is a photon detection type sensor such as a CdTe semiconductor detector.

In the sensor 11 included in the X-ray detection unit 7, for example, an electron-hole pair is generated by the arrival of photons of the X-rays. A process of counting the photons (photon counting) is performed on the basis of energy (photon energy) obtained at this time. The counting process is performed by a calculation unit (not illustrated) included in the X-ray detection unit 7 or the sensor 11. Since the calculation load of the counting process is high, the calculation unit tends to generate heat during operation of the X-ray inspection apparatus 1.

The X-ray detection unit 7 discriminates the photon energy of the detected X-rays into the two or more energy regions on the basis of an arbitrary threshold value. As a result, since the X-ray detection unit 7 can detect the X-rays by discriminating the X-rays into the two or more energy regions on the basis of the arbitrary threshold value, the photon counting can be performed for each energy region. The X-ray detection unit 7 outputs, to the control unit 10, a signal (detection result signal) that corresponds to the detection result of the X-rays and that has been discriminated. In the present embodiment, the X-ray detection unit 7 discriminates the photon energy of the detected X-rays into at least a first energy region and a second energy region higher than the first energy region by using the arbitrary threshold value. The arbitrary threshold value is, for example, one or more values (unit: keV) set by the control unit 10. Thus, the first energy region and the second energy region may be divided by using one threshold value, or may be divided by using different threshold values (e.g., a first threshold value and a second threshold value different from the first threshold value). In the latter case, one or a plurality of energy regions may be present between the first energy region and the second energy region. For example, the X-ray detection unit 7 may discriminate the photon energy into the first energy region, the second energy region, and a third energy region lower than the first energy region and the second energy region. The arbitrary threshold value and the number thereof can be confirmed as appropriate via the display operation unit 8 depending on a change in the type of the article G, a change in the inspection conditions, or the like. Note that the method of setting the arbitrary threshold value will be described later.

At least when the X-ray inspection apparatus 1 is activated, sensitivity correction (calibration) of the X-ray detection unit 7 is performed. In the present embodiment, the arbitrary threshold value is set during the sensitivity correction when the X-ray inspection apparatus 1 is activated. In addition, the sensitivity correction is also performed when the arbitrary threshold value is changed. By performing the sensitivity correction each time the arbitrary threshold value is changed, the output of the sensor 11 corresponding to the set threshold value can be obtained. The sensitivity correction of the X-ray detection unit 7 will be described in detail later. Note that the sensitivity correction of the X-ray detection unit 7 corresponds to correction of an output difference between the sensors 11 included in the X-ray detection unit 7.

During the operation of the X-ray inspection apparatus 1, the temperature of the X-ray detection unit 7 rises due to heat generation of at least either the sensors 11 or the calculation unit described above. Due to the rise in temperature of the X-ray detection unit 7, the output of the X-ray detection unit 7 may become unstable particularly immediately after the activation of the X-ray inspection apparatus 1. As a specific example, due to the rise in temperature of the X-ray detection unit 7, counting processing accuracy of at least one sensor 11 deteriorates, and thus, an erroneous count number may be output. This may cause an inappropriate X-ray image to be generated. For this reason, the X-ray detection unit 7 includes, in addition to the sensors 11, a cooling element (not illustrated) that cools the X-ray detection unit 7. Operating the cooling element during the operation of the X-ray inspection apparatus 1 can suppress the change in temperature of the X-ray detection unit 7. For example, after a predetermined period (also referred to as a first period) elapses after starting the detection of the X-rays by the X-ray detection unit 7, the X-ray detection unit 7 detects the X-rays that are a reference for the sensitivity correction and that have not passed through the article G. The first period is, for example, equal to or longer than 10 seconds, equal to or longer than 8 seconds, equal to or longer than 6 seconds, or equal to or longer than 5 seconds, but is not limited thereto. The first period may be adjusted depending on the type, specifications, installation environment, and the like of the X-ray inspection apparatus 1. From the perspective of power consumption, the first period may be set as short as possible. Note that the cooling element is, for example, a Peltier element.

In general, a period required from the start of X-ray detection by the X-ray detection unit 7 to stabilization of the output of the X-ray detection unit 7 is equal to or longer than a period required from the start of X-ray irradiation by the X-ray irradiation unit 6 to stabilization of the output of the X-ray irradiation (period during which irradiation by the X-ray source is stabilized). Thus, the first period is equal to or longer than the period required from the start of the detection of the X-rays by the X-ray detection unit 7 to the stabilization of the output of the X-ray detection unit 7. Similarly, the first period is equal to or longer than the period during which the irradiation by the X-ray source is stabilized. Accordingly, from the perspective of shortening the sensitivity correction of the X-ray detection unit 7, at least the detection of the X-rays by the X-ray detection unit 7 may be started when the X-ray inspection apparatus 1 is activated. From the perspective of stabilizing the output of the X-ray detection unit 7, the X-ray irradiation unit 6 starts the X-ray irradiation during the first period. In this case, the X-ray irradiation is started in a manner that the X-ray irradiation is stabilized by the end of the first period. In the sensitivity correction, the X-ray irradiation by the X-ray irradiation unit 6 may be started simultaneously with the start of the detection of the X-rays by the X-ray detection unit 7.

As illustrated in FIG. 1, the display operation unit 8 is an unit (display unit) provided in the device main body 2. The display operation unit 8 displays various types of information and receives input operations under various conditions from an external source. The display operation unit 8 is, for example, a liquid crystal display and displays an operation screen as a touch panel. In this case, an operator can input various conditions via the display operation unit 8. An example of the input operation is receiving a selection operation of an image (details will be described later) to be used for inspection of the article G by an inspection unit 23 (see FIG. 3) included in the control unit 10. With this operation, a desired inspection result can be suitably obtained. An example of another input operation is receiving a selection operation, a switching operation, or the like of the type of the article G to be inspected by the X-ray inspection apparatus 1. With this operation, an inspection result depending on the type of the article G can be suitably obtained.

The control unit 10 is an unit to which the detection result of the X-ray detection unit 7 is input, and is disposed in the device main body 2. The control unit 10 controls operations of the respective units (in the present embodiment, the conveying unit 5, the X-ray irradiation unit 6, the X-ray detection unit 7, and the display operation unit 8) of the X-ray inspection apparatus 1. The control unit 10 includes a processor such as a central processing unit (CPU), a memory such as a read only memory (ROM) and a random-access memory (RAM), and storage such as a solid state drive (SSD). A program for controlling the X-ray inspection apparatus 1 is stored in the ROM.

Figure 3:
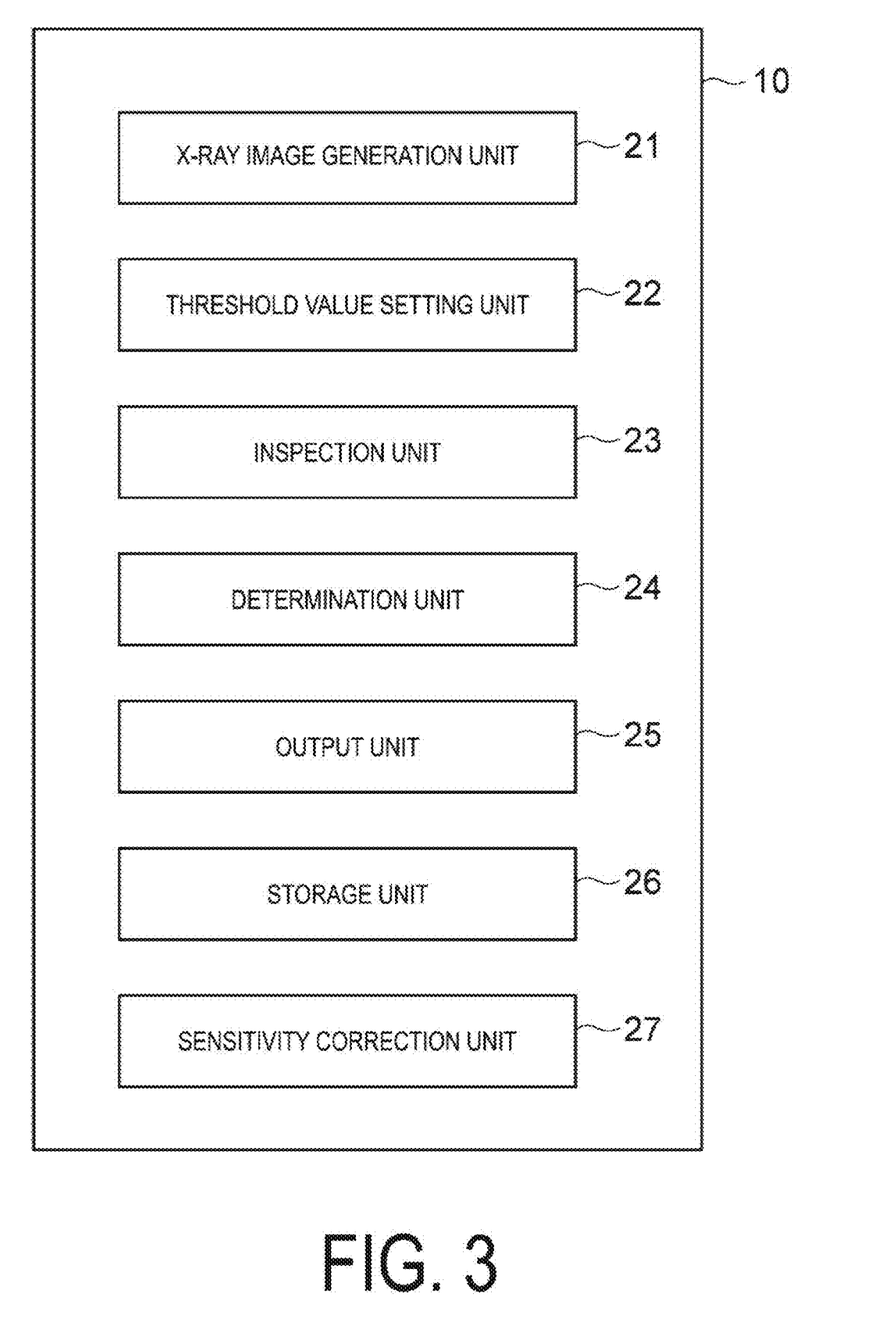
FIG. 3 is a functional configuration diagram illustrating a control unit.

FIG. 3 is a functional configuration diagram of the control unit. As illustrated in FIG. 3, the control unit 10 includes an image generation unit 21, a threshold value setting unit 22, an inspection unit 23, a determination unit 24, an output unit 25, a storage unit 26, and a sensitivity correction unit 27.

The image generation unit 21 is an unit that develops a signal (e.g., the detection result signal described above) output from the X-ray detection unit 7 into a two dimensional image on a memory. The image generation unit 21 is mainly configured by, for example, a graphics processing unit (GPU). The memory in which the two dimensional image is developed is, for example, a memory included in the GPU, but is not limited thereto. The image generation unit 21 generates two or more X-ray transmission images corresponding to the two or more energy regions based on the detection result of the X-rays by the X-ray detection unit 7. Each X-ray transmission image may be an image to be used for the inspection of the article G (hereinafter, may be simply referred to as an "inspection image") or a setting image the arbitrary threshold value (hereinafter, may be simply referred to as a "threshold value setting image"). The inspection image is generated during the inspection of the article G by the X-ray inspection apparatus 1. The threshold value setting image is generated, for example, during setting or adjustment of the X-ray inspection apparatus 1 (e.g., during the sensitivity correction of the X-ray inspection apparatus 1). Note that the image generation unit 21 may generate, as the X-ray transmission image, for example, a total transmission image corresponding to all the X-rays in the plurality of energy regions on the basis of the detection result.

Figure 4A:
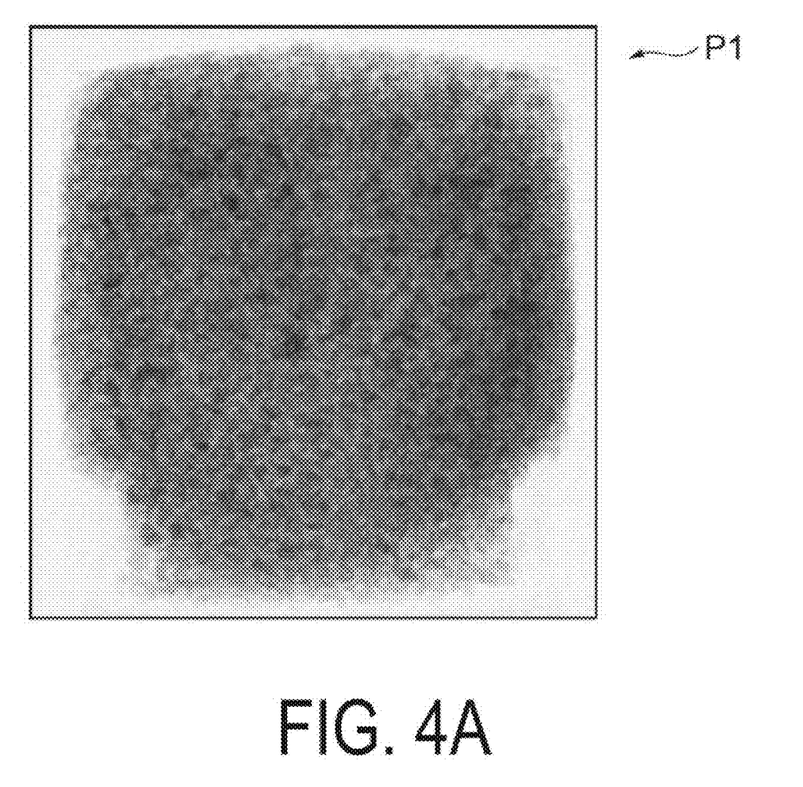
FIG. 4A is a diagram illustrating a first transmission image.
Figure 4B:
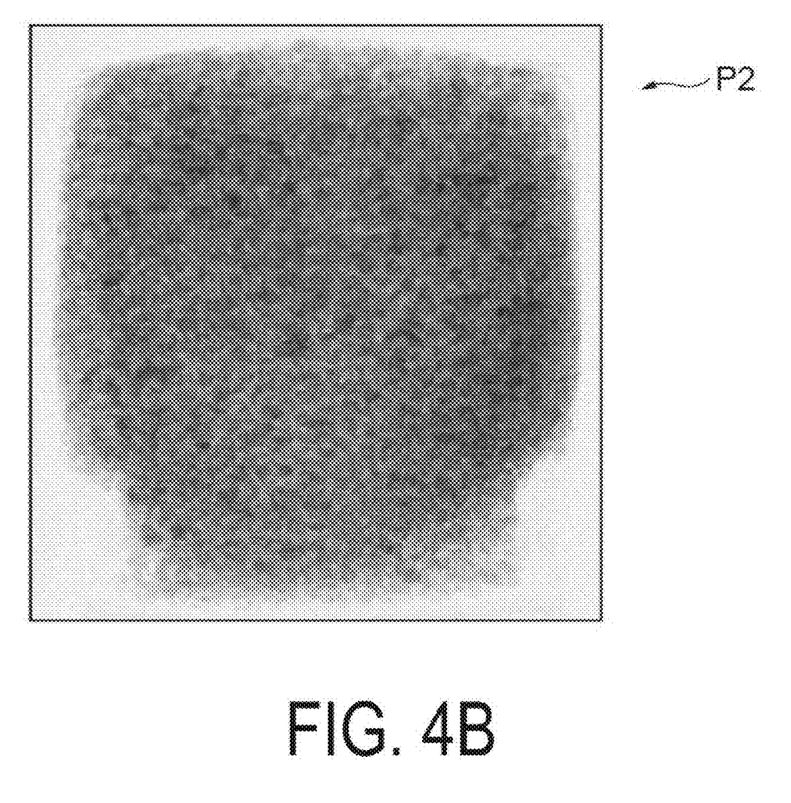
FIG. 4B is a diagram illustrating a second transmission image.

In the present embodiment, the image generation unit 21 generates, as the inspection images, a first inspection image P1 (see FIG. 4A) corresponding to the X-rays in the first energy region, a second inspection image P2 (see FIG. 4B) corresponding to the X-rays in the second energy region, and a difference image P3 (see FIG. 5) obtained by subtraction processing of the first inspection image P1 and the second inspection image P2. In addition, the image generation unit 21 can generate, as the threshold value setting images, a first setting image corresponding to the X-rays in the first energy region and a second setting image corresponding to the X-rays in the second energy region.

The first inspection image P1 is generated on the basis of, for example, some information included in the detection result signal. The second inspection image P2 is generated on the basis of, for example, some other information included in the detection result signal. In each of the first inspection image P1 and the second inspection image P2, the article G and a background other than the article G are shown. As in the example illustrated in FIG. 4A, the first inspection image P1 is overall darker than the second inspection image P2. On the other hand, as in the example illustrated in FIG. 4B, the second inspection image P2 is brighter as a whole than the first inspection image P1. In the present embodiment, comparison in brightness between the first inspection image P1 and the second inspection image P2 corresponds to a comparison between the brightness of the article G displayed in the first inspection image P1 and the brightness of the article G displayed in the second inspection image P2.

Figure 5:
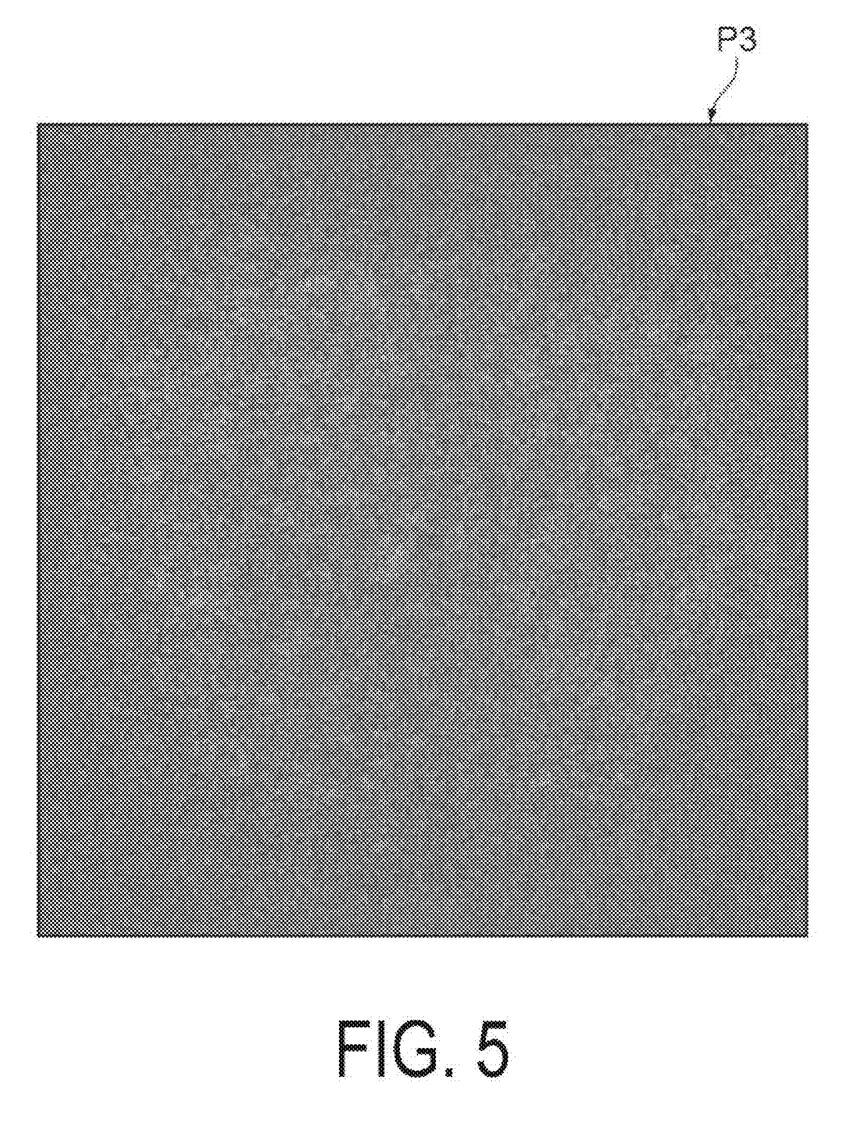
FIG. 5 is a diagram illustrating a difference image.

The difference image P3 is, for example, an image (image for energy analysis) generated by performing image processing on the first inspection image P1 or the second inspection image P2 by using an image processing algorithm. The image processing algorithm is a type indicating a processing procedure of the image processing to be performed on the first inspection image P1 or the second inspection image P2. The image processing algorithm to be used for the first inspection image P1 and the image processing algorithm to be used for the second inspection image P2 may be different from each other. For example, to equalize the brightness of the first inspection image P1 and the brightness of the second inspection image P2, a process of changing the brightness may be performed on one of the first inspection image P1 or the second inspection image P2. For example, Japanese Patent Application No. 2021-195926 (JP 2023-082280 A) incorporated herein by reference, describes example of utilizing a brightness distribution. Moreover, Japanese Patent Application No. 2021-195926 (JP 2023-082280 A) incorporated herein by reference, describes examples of the image processing algorithm.

The image generation unit 21 may use a program automatically set by machine learning instead of using the image processing algorithm described above. Such a program is a predictive model (learned model) generated by machine learning, and is an inference program incorporating parameters (learned parameters) obtained as a result of the machine learning. Examples of the machine learning used for the learned model include a neural network, a support vector machine, and a genetic algorithm. The learned model may include a convolutional neural network or a neural network including a plurality of layers (e.g., eight or more layers). That is, the learned model corresponding to the program described above may be generated by deep learning.

The threshold value setting unit 22 is a unit that sets the threshold value for discriminating the X-rays detected by the X-ray detection unit 7 into the two or more energy regions. The threshold value setting unit 22 sets the arbitrary threshold value on the basis of, for example, gray levels of two or more X-ray transmission images. The threshold value setting unit 22 sets the arbitrary threshold value on the basis of a threshold value at which a difference in shade between the first setting image and the second setting image is within a predetermined range. The threshold value setting unit 22 first sets a threshold value (provisional threshold value) at which a difference (brightness difference) between a background brightness of the first setting image (first background brightness denoted as B1) and a background brightness of the second setting image (second background brightness denoted as B2) is within the predetermined range. The predetermined background brightness of the X-ray transmission image corresponds to, for example, a value obtained by dividing a total of brightnesses of pixels included in the image by the number of pixels. The brightness difference in the present embodiment corresponds to a value ($|B2-B1|/(B1+B2)$) obtained by dividing the absolute value ($|B2-B1|$) of the difference between the first background brightness and the second background brightness by the total ($B1+B2$) of the first background brightness and the second background brightness. In the present embodiment, it is determined that the brightness difference is within the predetermined range when the brightness difference is equal to or smaller than 0.05, but the disclosure is not limited thereto. Subsequently, the threshold value setting unit 22 sets the arbitrary threshold value by adding a correction value (unit: keV) to the obtained provisional threshold value. The correction value is an arbitrary value determined by an operator via the display operation unit 8 or the like, for example. The correction value is, for example, equal to or more than −10 keV and equal to or less than 10 keV. Note that the correction value may be 0. That is, the arbitrary threshold value may be the provisional threshold value described above.

The threshold value setting unit 22 changes the threshold value until the arbitrary threshold value is set (that is, when the difference in shade between the two or more X-ray transmission images is outside of the predetermined range). For example, Japanese Patent Application No. 2022-37999 (JP 2023-132587 A) incorporated herein by reference, describes a method for such adjustment of the threshold value by the threshold value setting unit 22.

The inspection unit 23 inspects the article G on the basis of the X-rays that have been transmitted through the article G and that are detected by the X-ray detection unit 7. The inspection unit 23 inspects the article G on the basis of at least some of a plurality of images generated by the image generation unit 21. The inspection unit 23 inspects the article G by using, for example, the difference image P3. Note that the inspection unit 23 may inspect the article G on the basis of two or more images among the plurality of images generated by the image generation unit 21. For example, the inspection unit 23 inspects the article G for the presence or absence of a foreign matter, the presence or absence of a chip or crack, and the like, but no limitation is intended. In a case where the article G is wrapped in a packaging material having a sheet shape, the inspection unit 23 can also inspect breakage of the packaging material, seal failure (seal biting) of the packaging material, and the like. In a case where the article G is accommodated in a package, the inspection unit 23 can perform a confirmation inspection for foreign matter in the package, a missing part confirmation inspection, an accommodated quantity confirmation inspection, a cavity confirmation inspection, and the like. The inspection unit 23 transmits the inspection result of the article G to the determination unit 24 and the storage unit 26.

The determination unit 24 determines whether the article G is a non-defective article on the basis the inspection result received from the inspection unit 23. For example, the determination unit 24 determines the presence or absence of a foreign matter in the article G, or the presence or absence of a chip or crack of the article G. The determination unit 24 transmits the determination result to the output unit 25 and the storage unit 26.

The output unit 25 outputs the determination result of the determination unit 24 to a portion other than the control unit 10 in the X-ray inspection apparatus 1 or a device different from the X-ray inspection apparatus 1. Accordingly, the X-ray inspection apparatus 1 or the device different from the X-ray inspection apparatus 1 (e.g., a sorting device disposed further downstream than the X-ray inspection apparatus 1) can perform an operation when the article G is a defective article. Examples of the device different from the X-ray inspection apparatus 1 include the carry-in conveyor 51, the carry-out conveyor 52, and a notification device.

The storage unit 26 stores signals, data, and the like that are generated by the control unit 10. For example, the storage unit 26 may store not only the detection result signal transmitted from the X-ray detection unit 7 and the data of the image transmitted from the image generation unit 21 but also the threshold value set by the threshold value setting unit 22. In this case, the storage unit 26 stores a threshold value corresponding to the type of the article G. Accordingly, when the type of the article G is switched, the threshold value can also be automatically changed. The storage unit 26 may store data related to the inspection result transmitted from the inspection unit 23 and data related to the determination result transmitted from the determination unit 24.

The sensitivity correction unit 27 is a unit that performs the sensitivity correction of the X-ray detection unit 7 on the basis of the X-rays that are detected by the X-ray detection unit 7 and that have not been transmitted through the article G (hereinafter also referred to as "non-transmitted X-rays"). The sensitivity correction unit 27 performs the sensitivity correction described above at least when the X-ray inspection apparatus 1 is activated. In addition, the sensitivity correction unit 27 performs the sensitivity correction described above when the threshold value is changed by the threshold value setting unit 22. In a case where the threshold value corresponding to the type of the article G is stored in the storage unit 26, the sensitivity correction unit 27 may perform the sensitivity correction when the type of the article G is switched. Note that when the type of the article G is switched, the threshold value is not changed in some cases. Thus, the sensitivity correction unit 27 may perform the sensitivity correction when the type of the article G is switched and the threshold value is changed.

In the sensitivity correction of the X-ray detection unit 7 by the sensitivity correction unit 27, a bright level is obtained on the basis of the X-rays that have not been transmitted through the article G. The bright level is a count number of photons detected when the X-rays not transmitted through the article G are incident on the X-ray detection unit 7. The bright level may change depending on the output of the X-ray irradiation unit 6 or the like. Thus, the bright level is not limited to a single level and may be a plurality of levels. For example, the bright level includes at least a maximum bright level obtained when the output of the X-ray irradiation unit 6 is 100% and an intermediate bright level (gray level) obtained when the output of the X-ray irradiation unit 6 is 50%. In the present embodiment, a dark level does not need to be acquired by the X-ray detection unit 7 in the sensitivity correction described above. In this case, simply, the fact that the number of detected photons is 0 may be preset as the dark level. Alternatively, in the sensitivity correction described above, the dark level may be set for when the number of photons detected by the X-ray detection unit 7 is 0.

Figure 6:
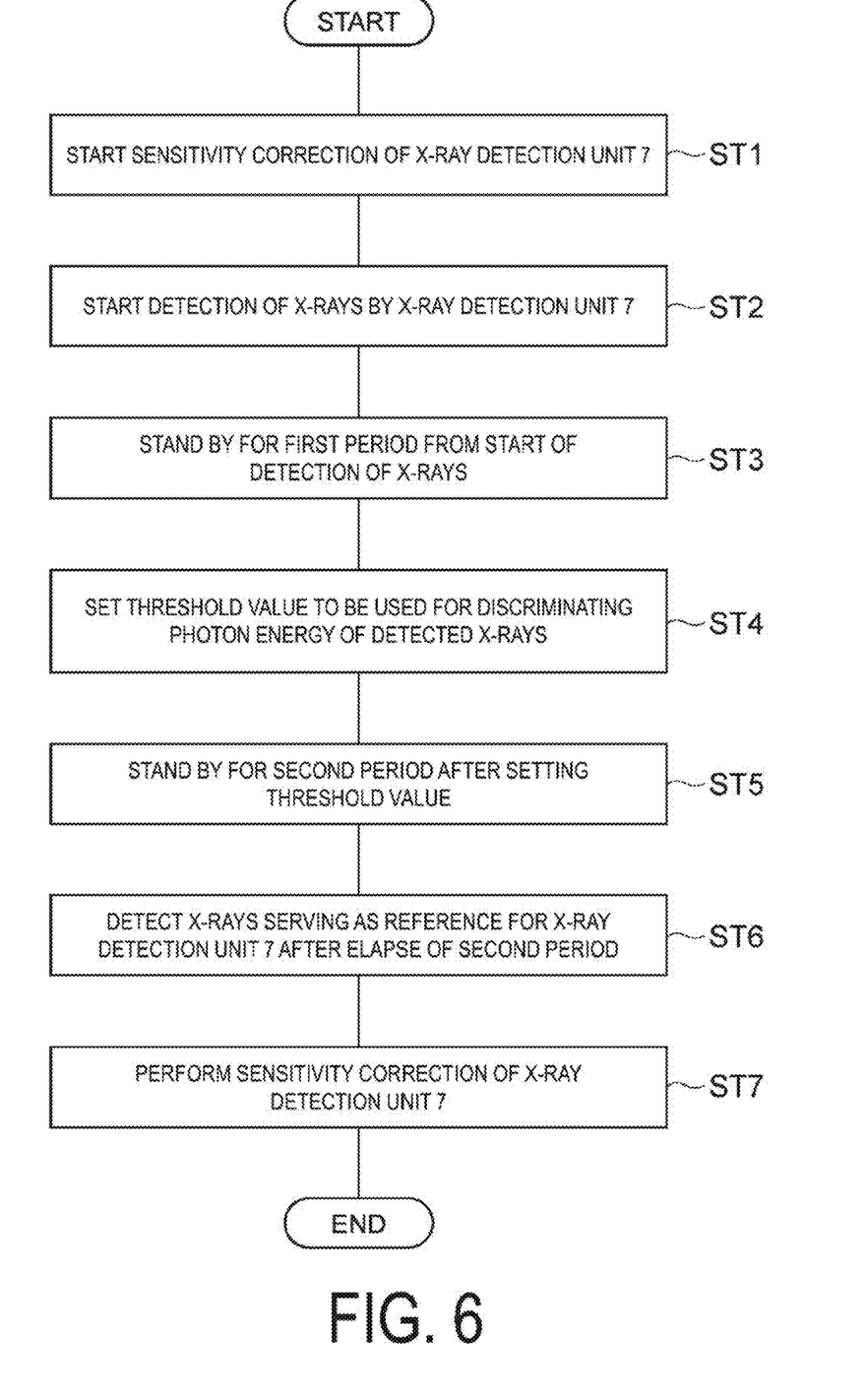
FIG. 6 is a flowchart illustrating a sensitivity correction method.

Next, an example of a sensitivity correction method of the X-ray inspection apparatus 1 according to the present embodiment will be described with reference to FIG. 6. FIG. 6 is a flowchart illustrating the sensitivity correction method.

As illustrated in FIG. 6, first, when the X-ray inspection apparatus 1 is activated, the sensitivity correction of the X-ray detection unit 7 is started (step ST1). In step ST1, the X-ray inspection apparatus 1 is activated and inspection parameters, an initial value of the threshold value, and the like are set for the X-ray detection unit 7. Subsequently, the detection of the X-rays by the X-ray detection unit 7 is started (step ST2). In the present embodiment, in step ST2, the irradiation of the X-rays by the X-ray irradiation unit 6 is started at the same time as the detection of the X-rays by the X-ray detection unit 7, but no limitation is intended. Note that, in step ST2, the result of detection of the X-rays by the X-ray detection unit 7 is not used in the sensitivity correction. Thus, an unstable detection result is less likely to be used.

Next, the process stands by for the first period from the start of the detection of the X-rays by the X-ray detection unit 7 (step ST3). In step ST3, during the first period, the X-ray detection by the X-ray detection unit 7 is maintained, and the X-ray detection unit 7 generates heat. In step ST3, the cooling element of the X-ray detection unit 7 also operates to adjust the temperature of the X-ray detection unit 7. Similarly, during the first period described above, the X-ray irradiation by the X-ray irradiation unit 6 is maintained. This stabilizes the output of the X-ray irradiation unit 6. Note that, when the X-ray irradiation by the X-ray irradiation unit 6 is not started in step ST2, the X-ray irradiation by the X-ray irradiation unit 6 is started in step ST3. In other words, when the X-ray irradiation by the X-ray irradiation unit 6 is not started in step ST2, the X-ray irradiation by the X-ray irradiation unit 6 is started in the first period. Note that, also in step ST3, the detection result of the X-rays by the X-ray detection unit 7 is not used in the sensitivity correction. Thus, an unstable detection result is less likely to be used.

Figure 7:
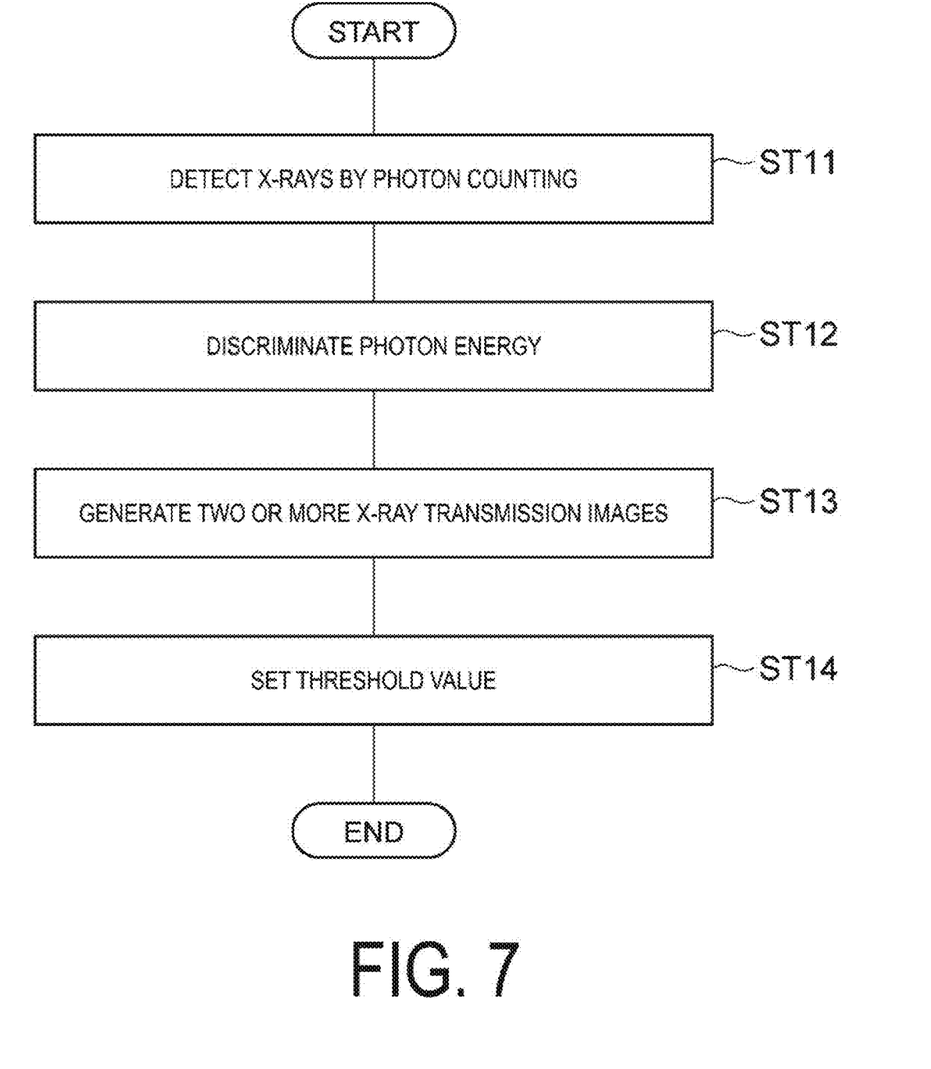
FIG. 7 is a flowchart illustrating a method of setting a threshold value.

Subsequently, after the first period from the start of the detection of the X-rays by the X-ray detection unit 7 has elapsed (that is, after step ST3), the arbitrary threshold value to be used for discriminating the photon energy of the detected X-rays is set (step ST4). In step ST4, first, the X-ray detection unit 7 detects the non-transmitted X-rays by photon counting. Then, the arbitrary threshold value is set by using the detection result of the X-ray detection unit 7 in step ST4. Here, the above-described step ST4 will be described in detail with reference to FIG. 7. FIG. 7 is a flowchart illustrating an example of a method of setting the threshold value.

As illustrated in FIG. 7, first, the X-rays are detected by photon counting (step ST11). In step ST11, the X-ray detection unit 7 detects the X-rays by photon counting. Next, the photon energy of the detected X-rays is discriminated into the two or more energy regions on the basis of the arbitrary threshold value (step ST12). In step ST12, the X-ray detection unit 7 discriminates the photon energy into the first energy region and the second energy region on the basis of the predetermined initial threshold value. Subsequently, the two or more X-ray transmission images corresponding to the two or more energy regions are generated by using the photon energy (step ST13). In step ST13, the first setting image is generated from the X-ray detection result corresponding to the first energy region, and the second setting image is generated from the X-ray detection result corresponding to the second energy region.

Subsequently, the arbitrary threshold value is set on the basis of the gray levels of the two or more X-ray transmission images (step ST14). In step ST14, the threshold value (provisional threshold value) is set such that a difference (brightness difference) between the background brightness of the first setting image and the background brightness of the second setting image is within a predetermined range. Subsequently, the arbitrary threshold value is set by adding the correction value to the obtained provisional threshold value. Note that, in step ST14, in a case where the difference in shade between the two or more X-ray transmission images is outside of the predetermined range, the threshold value is changed, and then steps ST11 to ST14 are performed until the difference is within the predetermined range. For example, Japanese Patent Application No. 2022-37999 (JP 2023-132587 A) incorporated herein by reference, describes a method for repeatedly performing steps ST11 to ST14.

Referring back to FIG. 6, the process stands by for the second period after the threshold value is set (step ST5). By performing step ST5, the sensitivity correction of the X-ray detection unit 7 can be more appropriately performed. In step ST5, the X-ray detection by the X-ray detection unit 7 is maintained during the second period. On the other hand, in step ST5, the detection result of the X-rays by the X-ray detection unit 7 is not used in the sensitivity correction. Note that the second period is, for example, equal to or longer than 10 seconds, equal to or longer than 8 seconds, equal to or longer than 6 seconds, or equal to or longer than 5 seconds, but no limitation is intended. The second period may be adjusted depending on the type, specifications, installation environment, and the like of the X-ray inspection apparatus 1. From the perspective of power consumption or the like, the second period may be set as short as possible.

Subsequently, after a predetermined period from the setting of the above-described threshold value has elapsed (that is, after step ST5), the X-ray detection unit 7 detects the X-rays that serve as a reference for the X-ray detection unit 7 and that have not been transmitted through the article G (step ST6). Subsequently, the sensitivity correction of the X-ray detection unit 7 is performed on the basis of the non-transmitted X-rays detected by the X-ray detection unit 7 (step ST7). In the sensitivity correction, for example, for each sensor 11, obtaining the bright level, obtaining a zero point, and calculating a span coefficient value are performed. A calibration curve may be created with this information. The dark level may be obtained in the sensitivity correction. Subsequently, the obtained bright level, the calculated value, and the like are set to each sensor 11 of the X-ray detection unit 7. With the above steps, the sensitivity correction of the X-ray detection unit performed when the X-ray inspection apparatus 1 is activated is complete. After the sensitivity correction is complete, the inspection of the article G by the X-ray inspection apparatus 1 can be satisfactorily performed.

For example, at least steps ST6 and ST7 are performed again when the threshold value is changed and after the sensitivity correction method is performed when the X-ray inspection apparatus 1 is activated. In the present embodiment, at least steps ST6 and ST7 are performed each time the threshold value is changed and after the sensitivity correction method is performed when the X-ray inspection apparatus 1 is activated. Alternatively, at least steps ST6 and ST7 are performed each time the type of the article G is switched and after the sensitivity correction method is performed when the X-ray inspection apparatus 1 is activated. Note that when the type of the article G is switched, the threshold value is not changed in some cases. Thus, at least steps ST6 and ST7 may be performed each time the type of the article G is switched and the threshold value is changed.

In general, to achieve satisfactory inspection performance of an X-ray inspection apparatus including a detection unit capable of performing detection by photon counting, it is important not only to set a threshold value depending on the article that is the inspection target but also to perform sensitivity correction (calibration) of the detection unit depending on the threshold value. In the X-ray inspection apparatus 1 according to the above-described embodiment, the sensitivity correction unit 27 performs the sensitivity correction when the threshold value setting unit 22 changes the threshold value. Thus, the sensitivity correction can be performed depending on the set threshold value. As a result, satisfactory inspection performance of the X-ray inspection apparatus 1 can be achieved.

In the present embodiment, the X-ray inspection apparatus 1 may include the image generation unit 21 that generates the two or more X-ray transmission images corresponding to the two or more energy regions on the basis of the output result of the X-ray detection unit 7, and the threshold value setting unit 22 may set the threshold value on the basis of the gray levels of the two or more X-ray transmission images generated by the image generation unit 21. In this case, for example, when the article G to be inspected by the X-ray inspection apparatus 1 is changed, the threshold value setting unit 22 can set an appropriate threshold value depending on the change by using the two or more X-ray transmission images. In addition, the sensitivity correction is performed corresponding to the set threshold value. Incorporating automatic adjustment of the energy threshold value into the sensitivity correction of the X-ray detection unit 7 allows a necessary procedure to be performed before the inspection of the article G with high accuracy and in a short time. As a result, even when the type of the article G is changed or the like, satisfactory inspection performance can be achieved.

In the present embodiment, the X-ray inspection apparatus 1 may include the storage unit 26 that stores the threshold value, the storage unit 26 may store the threshold value corresponding to the type of the article G, and the sensitivity correction unit 27 may perform the sensitivity correction when the type of the article G is switched. In this case, since the sensitivity correction can be performed by using the threshold value corresponding to the type of the article G, satisfactory inspection performance of the X-ray inspection apparatus 1 can be achieved.

In the present embodiment, the X-ray inspection apparatus 1 may include the storage unit 26 that stores the threshold value, the storage unit 26 may store the threshold value corresponding to the type of the article, and the sensitivity correction unit 27 may perform the sensitivity correction when the type of the article is switched and the threshold value is changed. In this case, since the sensitivity correction is not performed unless the threshold value is changed, the X-ray inspection apparatus 1 can be efficiently prepared.

Although an embodiment of the disclosure has been described above, the disclosure is not necessarily limited to the above-described embodiment, and various modifications can be made without departing from the range of the disclosure.

Figure 8:
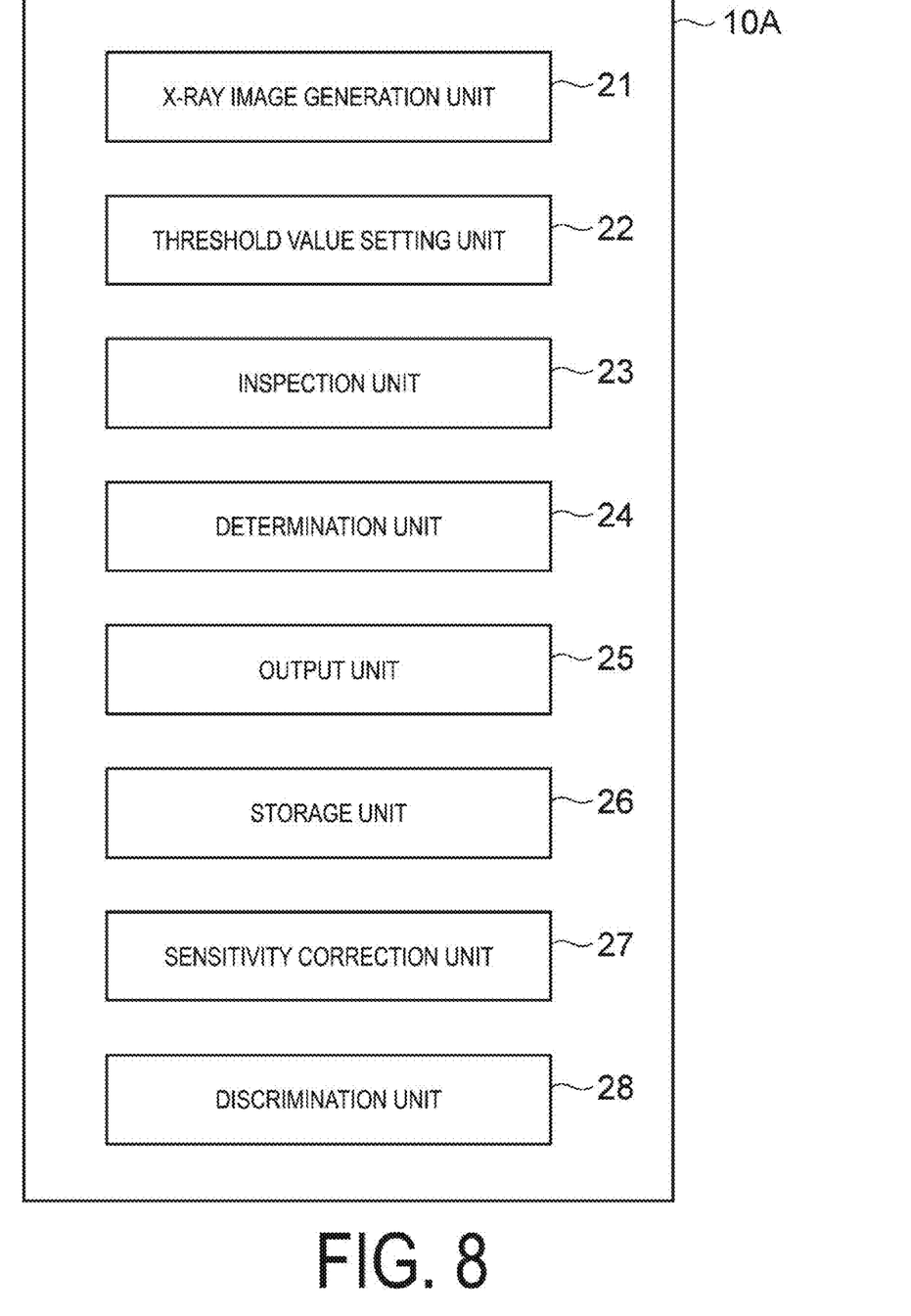
FIG. 8 is a functional configuration diagram illustrating a control unit according to a modification.

In the above-described embodiment, the X-ray detection unit discriminates the photon energy of the detected X-rays into the two or more energy regions on the basis of the arbitrary threshold value, but no limitation is intended. FIG. 8 is a functional configuration diagram of a control unit according to a modification. As illustrated in FIG. 8, a control unit 10A includes a discrimination unit 28 in addition to the image generation unit 21, the threshold value setting unit 22, the inspection unit 23, the determination unit 24, the output unit 25, the storage unit 26, and the sensitivity correction unit 27. The discrimination unit 28 discriminates the photon energy of the detected X-rays into the two or more energy regions on the basis of the arbitrary threshold value. For example, the discrimination unit 28 can discriminate the photon energy into the first energy region, the second energy region, and the third energy region. By using the control unit 10A, the X-ray detection unit does not need to perform photon counting for each energy region. In other words, the X-ray detection unit may simply output the detection result of the X-rays to the control unit 10A. This can simplify the configuration of the X-ray detection unit.

In the above-described embodiment, the X-ray inspection apparatus includes the control unit that performs the image processing, but no limitation is intended. For example, the function of performing the image processing, the function of determining the presence or absence of foreign matter included in the article on the basis of the difference image, and the function of displaying the X-ray inspection result in the control unit do not need to be included in the X-ray inspection apparatus. Instead, these functions may be implemented by a control device capable of wired communication or wireless communication with the X-ray inspection apparatus. In this case, an X-ray inspection system including the X-ray inspection apparatus and the control device to which the inspection result of the X-ray inspection apparatus is input can be achieved. According to such an X-ray inspection system, operational effects similar to those of the above-described embodiment can be achieved. In addition, the configuration of the control unit included in the X-ray inspection apparatus can be simplified. Further, a user can check the inspection results or the like even at a location away from the X-ray inspection apparatus. Note that the control device described above is not particularly limited and is, for example, a laptop PC or a tablet. Further, the control device does not need to include the function of determining the presence or absence of foreign matter.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An X-ray inspection apparatus comprising:
a conveying unit configured to convey an article;
an X-ray source configured to irradiate the article being conveyed by the conveying unit with X-rays;
a detection unit configured to detect the X-rays by photon counting;
a threshold value setting unit configured to set a threshold value for discriminating the X-rays detected by the detection unit into two or more energy regions;
an inspection unit configured to inspect the article on the basis of the X-rays transmitted through the article and detected by the detection unit; and
a sensitivity correction unit configured to perform sensitivity correction of the detection unit on the basis of the X-rays not transmitted through the article, the X-rays being detected by the detection unit, wherein
the detection unit is configured to discriminate and detect the X-rays into the two or more energy regions by using the threshold value, and
the sensitivity correction unit is configured to perform the sensitivity correction when the threshold value setting unit changes the threshold value.

2. The X-ray inspection apparatus according to claim 1, further comprising:
an image generation unit configured to generate two or more X-ray transmission images corresponding to the two or more energy regions based on an output result of the detection unit, wherein
the threshold value setting unit is configured to set the threshold value on the basis of gray levels of the two or more X-ray transmission images generated by the image generation unit.

3. The X-ray inspection apparatus according to claim 1, further comprising:
a storage unit configured to store the threshold value, wherein
the storage unit is configured to store the threshold value corresponding to a type of the article, and
the sensitivity correction unit is configured to perform the sensitivity correction when the type of the article is switched.

4. The X-ray inspection apparatus according to claim 1, further comprising:
a storage unit configured to store the threshold value, wherein
the storage unit is configured to store the threshold value corresponding to a type of the article, and
the sensitivity correction unit is configured to perform the sensitivity correction when the type of the article is switched and the threshold value is changed.

5. A sensitivity correction method for an X-ray inspection apparatus, the method comprising:
detecting X-rays not transmitted through an article by a detection unit configured to detect electromagnetic waves by photon counting, the detection unit discriminating the electromagnetic waves into two or more energy regions by using an arbitrary threshold value; and
performing sensitivity correction of the detection unit on the basis of the X-rays detected by the detection unit, wherein
the sensitivity correction is performed when the arbitrary threshold value is changed.

6. The sensitivity correction method according to claim 5, further comprising:
generating two or more X-ray transmission images corresponding to the two or more energy regions on the basis of an output result of the detection unit; and
setting the arbitrary threshold value on the basis of gray levels of the two or more X-ray transmission images.

* * * * *